United States Patent

[11] 3,571,957

| [72] | Inventors | Peter N. Cumming<br>Dayton;<br>Earle F. Smith, Kettering, Ohio |
|---|---|---|
| [21] | Appl. No. | 695,651 |
| [22] | Filed | Jan. 4, 1968 |
| [45] | Patented | Mar. 23, 1971 |
| [73] | Assignee | The National Cash Register Company<br>Dayton, Ohio |

[54] POSITIVE IDENTIFICATION MEANS AND METHOD FOR OWNER-PRESENTED DOCUMENTS
7 Claims, 5 Drawing Figs.

| [52] | U.S. Cl. | 40/2.2 |
|---|---|---|
| [51] | Int. Cl. | G09f 3/02 |
| [50] | Field of Search | 40/2.2, 158; 283/7, 8 |

[56] References Cited
UNITED STATES PATENTS

| 147,289 | 2/1874 | Smith | 283/7UX |
|---|---|---|---|
| 3,224,130 | 12/1965 | Leigh | 40/158 |
| 3,376,661 | 4/1968 | Hulett | 40/2.2 |
| 3,245,697 | 4/1966 | Nugent | 40/2.2 |
| 3,455,577 | 7/1969 | Kikumoto | 40/2.2X |

Primary Examiner—Robert W. Michell
Assistant Examiner—Wenceslao J. Contreras
Attorneys—Louis A. Kline and Wilbert Hawk, Jr.

ABSTRACT: A credit card or other identification document as issued to the owner named thereon having as a permanent part thereof a micronegative containing normally unreadable identifying indicia of the owner of the card or document and a viewer capable of enlarging the indicia on the negative sufficiently to produce a readable identification of the owner of the card or document.

PATENTED MAR 23 1971　　　　　　　　　　　　　　　　3,571,957
FIG. 1
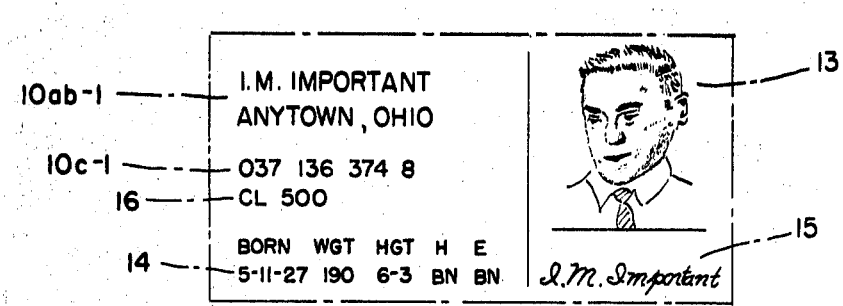
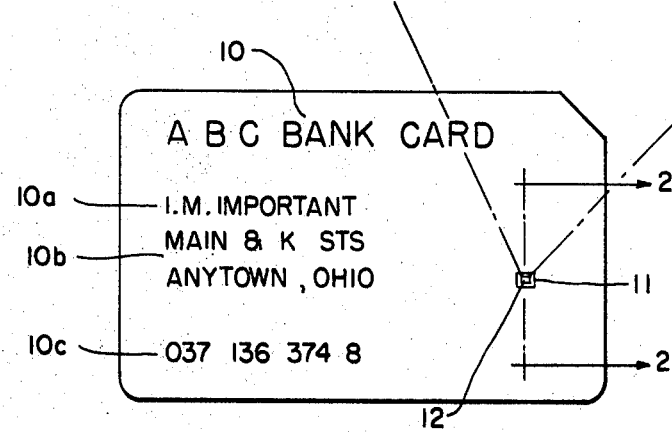
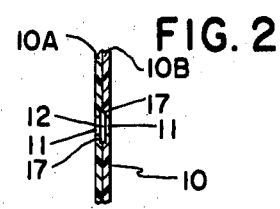
FIG. 2
FIG. 3
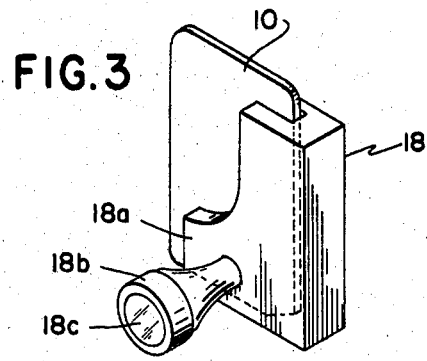
FIG. 4
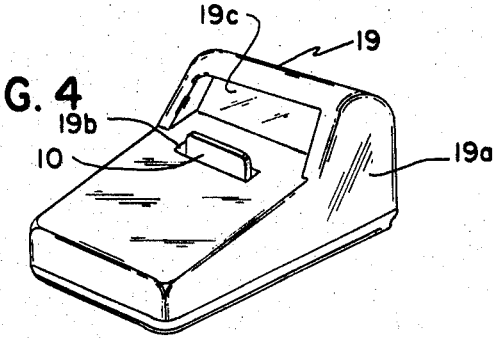
FIG. 5
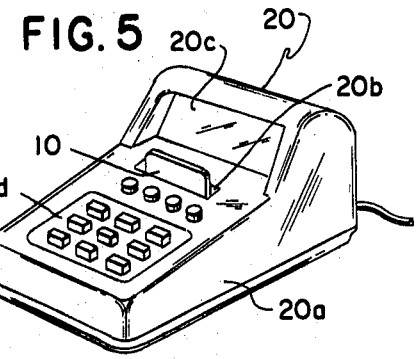
INVENTORS
PETER N. CUMMING &
EARLE F. SMITH
BY  Louis A. Kline
    Wilbert Hawk, Jr.
THEIR ATTORNEYS

POSITIVE IDENTIFICATION MEANS AND METHOD FOR OWNER-PRESENTED DOCUMENTS

BACKGROUND OF THE INVENTION

With considerable growth in credit card usage taking place every year within such typical industries as gasoline service stations, department stores, restaurants, airlines, hotels, motels, etc., and likewise so for certain other identification documents as used in the fields of banking, automobile service and repair, personal check cashing, etc., it is imperative that all steps possible be undertaken to prevent losses due to the fraudulent presentation of such credit cards or identification documents by persons to whom they were not originally and rightfully issued.

On such step heretofore proposed and commonly followed lies in the owner of such a card or document being required to apply his signature at a conspicuous zone thereon before it becomes valid for the purposes intended. While this of course offers some degree of protection, it has been found to provide little in those instances where the card or document gets into the hands of an experienced forger. Furthermore, when, through misdirected mailing, loss, or theft, such a card or document in an unsigned state finds its way to an unauthorized user who himself signs the owner's name thereto, this "required signature" approach is seen to constitute even less or actually no protection whatsoever.

Another such step heretofore proposed, but not so commonly seen, has been to provide a photographic likeness of the owner of such a card or document directly on the face thereof, either by a precise photo-application process where any attempt to change or alter it automatically defaces the card or document (U.S. Letters Pat. No. 3,152,901, issued Oct. 13, 1964, on the application of James R. Johnson), or by processes where such photographic likeness is normally invisible to the naked eye until subjected to strong transmitted light (U.S. Letters Pat. No. 2,395,804, issued Mar. 5, 1946, on the application of Ernest D. de Gruchy) or to ultraviolet light (U.S. Letters Pat. No. 3,048,697, issued Aug. 7, 1962, on the application of William J. Cavanaugh and Traugott Tschudi). While protection is of course increased considerably with the inclusion of such a picture of the owner on the card or document, the cost requirement thereof to a certain degree and the necessary space requirement thereof in particular leave this approach something less than totally acceptable. Furthermore, in providing such an identification means as a picture or the like of a size capable of determining by the naked eye and without enlargement whether the holder of the card or document is in fact the owner thereof, one is always faced with the problem of unintentional defacing—namely, by way of dirt, grease, scratching, etc.—of such picture through regular and ordinary use of the card or document for its intended purpose.

Mindful of these and certain other prior steps directed at providing a credit card or other identification document that is not usable by unauthorized persons, it is the primary object of the present invention to provide a means and a method of owner identification for valuable documents substantially different from anything thus far employed and considered to effectively overcome any and all objections and shortcomings heretofore and at present encountered in document bearing owner identification means.

A further object of the present invention is to provide such means and method which makes almost unlimited the degree of personal description type of identification indicia permitted to be carried by the card or document for insuring positive and accurate determination as to whether the holder thereof is in fact the owner named thereon.

Another object of the present invention is to provide such a means and method which permits as a part of a card or document additional identification indicia of the private account data or other quasi-secret business information type assigned by the card or document issuer to the owner named thereon and needed in certain business systems for transaction identification and account status determining purposes—one such example being in the banking industry and including an electronic computer system having a plurality of terminal input members, one located at each branch or associate bank unit and each capable of keyboard receipt of personal credit status data available from said card or document carried additional type identification indicia for the purpose of making selected transactions against a central bank account from various remote branch or associate bank locations.

These and other objects and advantages of the present invention will become apparent from the following detailed description, taken in conjunction with the drawings, wherein:

FIG. 1 is a front view of a representative identification card embodying the present invention and showing by enlargement illustration the extend of card bearing owner identification indicia permitted thereby;

FIG. 2 is a view in section and somewhat on an enlarged scale showing an acceptable method of permanency of a micronegative with the identification card of like document, taken along line 2—2 of FIG. 1;

FIG. 3 is a perspective view of a portable-in-size viewer for enlarging the identifying indicia on the micronegative of FIG. 1 to a readable size;

FIG. 4 is a desk-top-in-size viewer for enlarging the identifying indicia on the micronegative of FIG. 1 to a readable size and projecting it on an associated display screen; and FIG. 5 is a further desk-top-in-size viewer for enlarging the identifying indicia on the mirconegative of FIG. 1 to a readable size and projecting it on an associated display screen, and including keyboard means permitting entry therein and/or therethrough of selected indicia as found on said display screen.

DESCRIPTION OF THE PREFERRED EMBODIMENT

Looking to FIG. 1, where the identification document is in the form of a bank card 10 or the like, in addition to the usual embossment for owner's name 10a, address 10b, and account or similarly assigned code number 10c, such card 10 is provided with a small aperture 11, within which is permanently mounted a microfilm or like microscopic negative 12 containing selected identifying indicia relative to the owner named on the card. The precise indicia to be included on the negative 12 is of course that as elected by the issuer of the card or like document 10, normally of that kind and to that extend considered necessary for a positive identification to be made of the party for whom the card or document has been prepared. In this regard, and as included in the negative enlargement illustrated in FIG. 1, such indicia might very well include the name and address 10ab—1 of the party to whom the card or document has been issued, the account or code number 10c—1 as so assigned to such party, and, in all probability, a photographic likeness 13 of such party. Improvement of the ready identification is likewise possible by adding personal description data to complement the photographic likeness 13, as at 14 (FIG. 1), where the birth date, the weight, the height, and the color of hair and eyes of the party of such photographic likeness are set forth. Also, as shown, a facsimile signature 15 of the card or document owner may be desired for inclusion in the identifying indicia for comparison with any endorsement made by the party presenting the card or document 10 for use.

Location of the aperture 11, and hence of the micronegative 12, is of course again at the option of the issuer of the card or document 10, the essential requirement being that it be coordinated for quick and easy alignment within a particular enlargement viewer which may be specified. While not so illustrated herein, the negative might very well be worked into a particular decoration or trim provided around the edge of the card or document 10.

The mounting of the negative 12 within the aperture 11, wherever so located, may be by any suitable means affording permanency thereof with the card or document 10. One such means appearing to be quite satisfactory and conforming to the modern method of card fabrication is to fuse or otherwise cement, by means of well-known adhesives, the negative 12 within matching depressed areas 17 provided therefor around the aperture 11 and between each of front and rear laminated layers 10A and 10B going to make up the overall card or document 10 (FIG. 2). A clear plastic or like transparent material filling in the front and rear sections of the aperture 11 will of course protect against scratching or other surface damage to the negative 12. Although not illustrated herein, glueing or otherwise adhering the negative 12 within a single such inner depressed area 17 provided in one or the other only of the layers 10A and 10B, or even within a further depressed area around the aperture 11 but provided on one outer side only of the card or document 10, are still other ways considered totally acceptable for marrying the identification bearing micronegative 12 with the card or document 10.

It is of course clear, from both the illustration of FIG. 1 and the known characteristics of microfilm, that the identifying indicia on the negative 12 is normally unreadable by the naked eye and remains so until enlarged considerably by an appropriate viewer. In this regard, the individual receiving such a card or document 10 having the integral negative 12 must be equipped with some sort of viewing device capable of receiving the card or document 10 and effectively enlarging the overall indicia on the negative 12 thereof to an easily readable size. For gasoline service stations and other such card or document receivers working in many different areas and normally in an outside environment, a portable viewer of the type to be held up to any available light might very well meet all requirements. One such viewer is illustrated in FIG. 3, where there are arranged into an overall viewing unit 18 a card or document holder 18a, an eye piece 18b, and an appropriate optical lens system 18c for enlarging the indicia on the micronegative 12 upon making use of the unit 18 with a sufficient light source therebehind. The overall configuration of the holder 18a of course both retains and properly positions the card or document 10 with its aperture 11 immediately behind the eye piece 18b. In other applications, where such card or document receivers more or less work in a single location, such, for example, as would normally be the case in department store sales, airline ticket sales, lodging rental, etc., a desk or table size viewer of a general type as illustrated in FIG. 4 might be more suitable. As shown, the overall viewing unit 19 could consist of any desired-in-shape housing 19a having a slot 19b, into which the card or document 10 to be viewed is inserted, an appropriate optical lens system (not shown) for enlarging the indicia on the negative 12, and a screen or similar display 19c, onto which is projected the enlarged image of the negative-contained indicia. In each instance, the person viewing the now readable owner identifying indicia as so provided on the card or document 10, either through means of a portable or other enlargement apparatus, can readily make, and with a high degree of accuracy, a determination as to whether the present holder and user of the card or document 10 is in fact the owner thereof.

Looking again to FIG. 1, and recalling that the present invention also provides an available means for both general and specific identification as needed in certain business systems, it is seen that the indicia on the micronegative 12 might further include private account or transaction data 16, which, when made known to the receiver of the card or document 10, provides input information facilitating, as one example, online computer handling of the present transaction for which the card or document 10 is being used; that is, keeping a central bank or credit account continually updated immediately as and from where each and every business transaction is caused to be made with respect thereto. Such an added use of the invention would again involve a viewer for enlarging to a readable size the indicia of the negative 12, but directed more to a viewing apparatus similar to the device 20 of FIG. 5, which includes, over and above the usual housing 20a of the desired size and shape, card or document 10 receiving slot 20b, optical lens system and associated display screen 20c, a keyboard means 20d permitting, when once positive identification of the card or document 10 holder has been determined from the indicia 13, 14, and 15 as presented on the screen 20c, selected entry of the additional indicia 16 as further presented on the screen 20c for calling upon the central computer to condition itself toward the present keyboard-entered transactions to be made against a specified account. With such a combined viewer and terminal input member as illustrated in FIG. 5, it is clear that the owner of the card or document 10 may conduct his business at any one of various remote locations with respect to the central business account, without delay in central account updating according to each remote transaction immediately as made. This, of course, is but one of many applications in business records and control made available through a combined viewer and keyboard entry means for first determining positive identification of a particular card or document holder and thence performing at least one keyboard entry operation in accordance with precise business data confidentially assigned to such card or document holder.

While the present invention is admirably adapted to fulfill the objects as stated, it is clear that many modifications and variations may occur to those skilled in the art, all without departing from the spirit of the instant invention. It is thus to be understood that the scope of the invention hereof is intended to be limited only by that required by the following claims.

We claim:

1. The combination comprising a credit or similar identification card as issued to the owner named thereon having an aperture within which is provided a micronegative containing personal identifying indicia of the owner of the card and confidential data assigned by the issuer to the owner of the card, said indicia and data being of such size as to be illegible to the unaided eye, and a viewer adapted to receive said card and enlarge the indicia and data on the negative thereof sufficient for determining from said indicia whether the holder of the card is in fact the owner thereof, and said viewer including keyboard means for selected manual receipt of said confidential data when enlarged sufficiently for determination and after determining from said indicia that the holder of said card is the owner thereof.

2. The combination of claim 1 in which said confidential data comprises private business account data of the owner of the card, and said viewer through its keyboard means permits transmission of said account data therebeyond.

3. The combination of claim 2 in which said viewer is operably interconnected with a central computer system capable of reporting on and updating business accounts selected through data transmitted thereto through said keyboard means.

4. The combination of claim 1 in which said viewer includes a display screen for presenting enlargement to a readable size of said identifying indicia and confidential data.

5. The combination of claim 4 in which the identifying indicia presented readable on said display screen comprises the likeness of the face, facsimile signature, and a personal description of the owner of the card, and the confidential data presented readable on said display screen comprises private banking and/or credit account data of the owner of the card.

6. Positive identification method for owner-presented documents comprising the steps of including as a part of the document a micronegative containing normally unreadable identifying indicia personal to the owner of the document which becomes readable with sufficient enlargement thereof, subjecting the document to a viewer capable of enlarging the indicia on the negative sufficiently to produce a readable image thereof, including as a part of the viewer a keyboard capable of selected transmission therethrough of certain of the identifying indicia, and actuating the keyboard for transmitting such certain identifying indicia from the readable image thereof when once a positive identification of the owner of the document is determined from the readable image of certain other of the identifying indicia.

7. Positive identification method for owner-presented documents comprising the steps of including as a part of the document a micronegative containing normally unreadable personal identifying indicia and confidential account indicia of the owner of the document which becomes readable with sufficient enlargement thereof, subjecting the document to a viewer capable of enlarging the indicia on the negative sufficiently to produce a readable identification of the owner and of the account of the owner of the document, including as a part of the viewer a keyboard capable of transmission therethrough of the confidential account indicia of the owner, and actuating the keyboard for transmitting such account indicia when enlarged sufficiently for readable identification when once a positive identification of the owner of the document is established through the readable identification of the personal identifying indicia.